United States Patent [19]

Honshima et al.

[11] Patent Number: 4,829,206
[45] Date of Patent: May 9, 1989

[54] ARMATURE FOR AN ELECTRIC ROTARY MACHINE AND METHOD OF MANUFACTURING THE SAME

[75] Inventors: Teruhisa Honshima, Naka; Yasuaki Watanabe, Katsuta; Akira Takahachi, Naka; Tadayochi Samata; Akira Tohkairin, both of Katsuta; Nobuhiko Ogasawara, Mito, all of Japan

[73] Assignee: Hitachi, Ltd., Tokyo, Japan

[21] Appl. No.: 15,328

[22] Filed: Feb. 17, 1987

[30] Foreign Application Priority Data

Mar. 3, 1986 [JP] Japan .................... 61-43982

[51] Int. Cl.$^4$ ............... H02K 15/02; H02K 1/16; H02K 1/26
[52] U.S. Cl. ............... 310/214; 310/42; 310/216; 29/598; 29/606
[58] Field of Search ............... 29/596, 598, 606; 310/42, 214, 216

[56] References Cited

U.S. PATENT DOCUMENTS

| | | | |
|---|---|---|---|
| 2,781,465 | 2/1957 | Schuff | 310/214 X |
| 4,206,621 | 6/1980 | Kawasaki et al. | 29/596 X |
| 4,267,719 | 5/1981 | Walker | 29/596 X |
| 4,434,546 | 3/1984 | Hershberger | 29/598 |
| 4,570,333 | 2/1986 | Jones | 29/598 |

Primary Examiner—Carl E. Hall
Attorney, Agent, or Firm—Antonelli, Terry & Wands

[57] ABSTRACT

An armature for an electric rotary machine, comprising a laminated iron core including a plurality of slots, and teeth, alternately disposed in the cylindrical surface of the iron core, windings placed in said slots, and anchors for preventing the windings placed in the slots from being displaced, wherein the anchors are formed by deforming the end portions of the teeth, while forming before mounting the windings into the slots, a through hole extending through the end portion of each tooth.

12 Claims, 3 Drawing Sheets

ARMATURE FOR AN ELECTRIC ROTARY MACHINE AND METHOD OF MANUFACTURING THE SAME

BACKGROUND OF THE INVENTION

This invention relates to an armature for an electric rotary machine and a method of manufacturing such an armature, and particularly to an armature having half-closed slots adapted to effectively prevent the winding from being displaced.

Armatures having half-closed slots for preventing the winding from being displaced when used in an electric rotary machine are disclosed, for example, in U.S. Pat. No. 3,586,893 and Japanese Patent Laid-open No. 52-9805, wherein such slots are formed by pressing or bending the projections preliminarily formed near the openings of said slots.

However, the prior art involves drawbacks, as follows.

When the projection is bent into the slot, the tip of the projection may damage the insulator coating on the winding placed in the slot, thereby causing dielectric breakdown. Especially in case of a projection provided at its side with a slit, it has less mechanical strength and may be broken during a high speed operation. If the half-closed slot is to be formed by pressing a semi-circular projection, it is necessary to apply larger bending force by using a larger machine, or its circumferential area may become rough and adversely affect the uniformity of magnetic reluctance of the armature.

SUMMARY OF THE INVENTION

An object of the invention is to eliminate the drawbacks of the prior art and provide an armature for an electric rotary machine having a structure which assures forming of curved anchors over the openings of the slots to prevent the winding from being displaced.

The above-mentioned object can be achieved by providing half-closed slots which are formed by pressing and deforming the top end portions of the teeth between adjacent pairs of the slots in the armature core, while forming before mounting the windings into the slots, a through-hole at the end portion of each tooth.

The through-hole formed at the end portion of each tooth provides an empty space which is completely surrounded by the core material. When the end portion having through-hole is deformed, therefore, tension is produced in the portion surrounding the through hole thereby forming the winding-blocking anchor properly curved without bending into the slot.

The anchor thus formed will not damage the insulator coating of the winding placed in the slot, and the pressed surface of the tooth is flat so that the uniformity of magnetic reluctance can be maintained.

BRIEF DESCRIPTION OF THE DRAWINGS

Embodiments of the present invention will be described in detail in conjunction with the accompanying drawings, in which.

DESCRIPTION OF THE PREFERRED EMBODIMENTS

Figure 1:
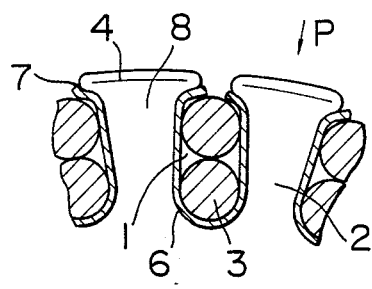
FIG. 1 shows a cross section of a part of an electric rotary machine armature according to this invention.

FIG. 1 shows a partially enlarged cross section of an armature of an electric rotary machine according to the present invention. Referring to FIG. 1 a laminated iron core 2 is provided with slots 1 each accommodating a plurality of insulated windings 3 which are protected by an insulator 6 such as paper. Each tooth 8 between an adjacent pair of the slots 1 is provided with anchors 7 fabricated by a method according to this invention, which will be described later in detail. As will be apparent later, the anchor 7 is formed with a curved surface projecting inside the slot and its curved shape is ideal for preventing the winding from being displaced without damaging the insulator coating on the winding. In FIG. 1 a reference numeral 4 indicates a trace of a small empty space which has been reduced by pressing the end portion of the tooth. According to the present invention, however, the empty space is completely reduced by the pressing process so that the trace is hardly distinguished by a human eye (refer to FIG. 2D). It is apparent that this former empty space will not provide any adverse affect on the magnetic reluctance in the armature.

A manufacturing process for the armature is now described with reference to FIGS. 2A to 2D. In the figures the same reference numerals designate like parts as in FIG. 1.

Figure 2A:
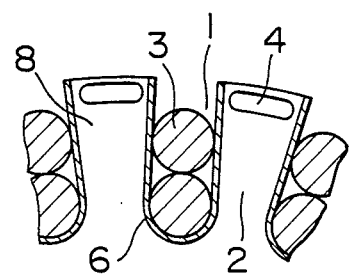
FIGS. 2A to 2D show a process of forming protrusions of an armature according to this invention.

Referring to FIG. 2A, two windings 3 are placed with the slot 1 formed in the laminated iron core 2 of the armature, and these windings are isolated from the inner wall of the slot by a paper insulator 6. As seen from the figure, a through-hole 4, which has an interior continuous wall that is surrounded by the core material, is formed to extend through and along the end surface of the tooth 8 between each pair of slots 1 in the laminated iron core 2. That is, the through-hole is located near the opening end of the slot. The through-hole 4 has an axis which extends parallel to the adjacent winding slots 1. In the embodiment of this invention, this through-hole 4 is formed by stacking steel plates punched into a predetermined shape with an opening. However, this through-hole may be formed before laminating the steel plates into an armature core.

Figure 2B:
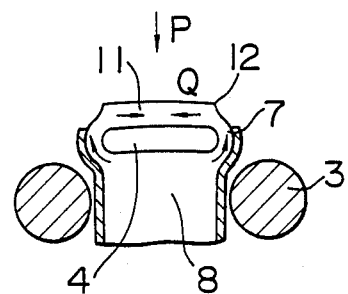
Figure 2C:
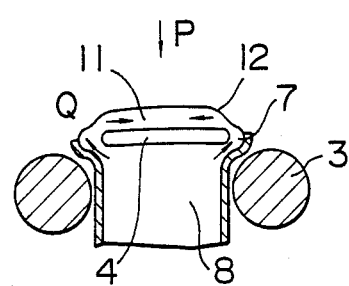

FIGS. 2B and 2C show the deformed states of the armature obtained during the process of pressing the armature shown in FIG. 2A in the direction indicated by the arrow P.

When the through-hole 4 is deformed by the force P, lateral portions of the laminated iron core 2 at the right and left sides of the hole, as viewed in the figure, protrude toward the slots 1. These portions are deformed and protrude without bending downwards into the slots because the lateral portions are pulled in the directions shown by arrows Q, respectively by the portion bridging the lateral portions at the upper side of the throgh-hole. FIG. 2B shows a cross section of the armature at an initial stage of the pressing process and FIG. 2C shows a cross section of the armature when the lateral and bridging portions are further deformed.

Figure 2D:
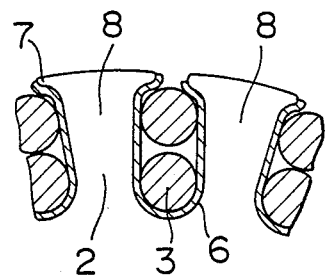

FIG. 2D shows a cross section of the armature when the pressing process has been finished and opposed interior surfaces of the through-hole 4 are engaged. The opening 4 in the laminated iron core is completely deformed and eliminated. The bridge portion 11 finally joins the main portion of the tooth 8 of the laminated iron core, and anchors 7 are formed to project inside the slots from both sides of the tooth thereby to prevent the winding from being displaced. Each anchor provides a smoothly curved inner surface of the slot together with the side wall of the tooth. Thereafter the windings and associated parts are secured by applying varnish or resin as in a conventional manner. The deformed bridge portion 11 may be removed by machining the circumference of the teeth 8 of the armature core. The removal of the bridge portion is effective to eliminate the non-uniformity of magnetic reluctance which may occur if the pressing process is insufficiently carried out and an empty space is remained near the armature surface.

Figure 3:
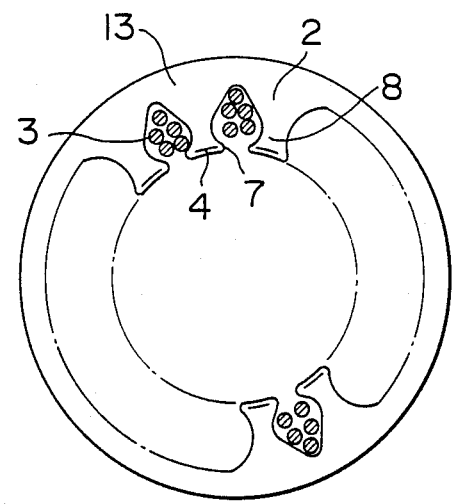
FIG. 3 shows a cross section of a stator armature according to this invention.

The embodiment described above is of a rotor to be used with, for example, an automotive starter motor, but this invention may be applied to a stator. FIG. 3 shows an example in which this invention is applied to an armature 13 of a stator for dynamos. In FIG. 3 like reference numerals designate like parts as in FIG. 1. The present invention may also be applied to flat armatures.

Figure 4:
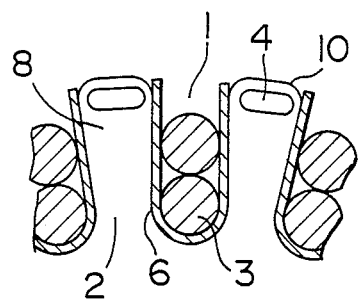
FIG. 4 shows a cross section of a part of an armature of another embodiment.

FIG. 4 shows a modification of the armature structure before being subjected to the pressing process as shown in FIG. 2A. Like reference numerals designate like parts as in FIG. 2A. In this modification, each tooth 8 of the laminated iron core 2 has a tip 10 whose edges are curved. This facilitates the insertion of the winding 3 into the slot 1 and also prevents the winding 3 from being damaged by sharp edges.

Figure 5A:
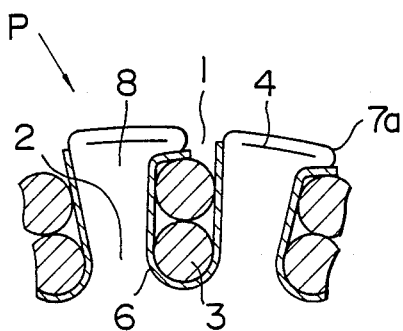
FIGS. 5A and 5B show further embodiments of this invention.
Figure 5B:
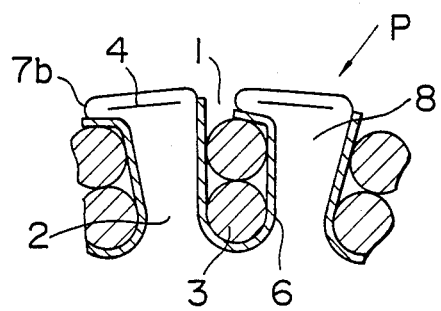

FIGS. 5A and 5B show further embodiments of this invention. In the embodiments shown in FIGS. 1 to 4, through-holes are deformed by a force P in a substantially radial direction with respect to the laminated iron core. In the embodiment of FIG. 5A or 5B, the pressing force is applied in a direction oblique to the radial direction so that the winding-blocking anchor 7a or 7b is created on the right-hand or left-hand edge of each tooth. According to these embodiments the shape of the half-closed slot can be adjusted by changing the direction in which the pressing force is applied.

Although the method of the pressing process has not been described, it is obvious that this may be achieved by any method well known in rolling, pressing or ironing works.

As described above, according to the present invention, an electric rotary machine armature is readily formed with half-closed slots having properly curved inner surfaces, which will not damage the insulator coating of the winding by using relatively simple devices.

We claim:

1. An armature for an electric rotary machine comprising:
    a cylindrical laminated iron core having a plurality of teeth each having an axis that extends radially from a core with spaces between the teeth serving as slots for receiving windings; and
    anchor means at end portions of said teeth for securing windings in respective slots comprising opposed engaged surfaces that are interior wall surfaces of a collapsed through-hole, said surfaces having been displaced into engagement by a force applied in a direction that is generally along the direction of the axis of each tooth thereby to displace the end portion of each tooth to bridge over part of an adjoining space and secure the underlying winding in its slot.

2. An armature for an electric rotary machine according to claim 1 wherein the through-hole is an elongated slot having its major axis lying in a circumferential direction and the surfaces that are displaced into engagement are generally parallel to said major axis.

3. An armature for an electric rotary machine according to claim 2 wherein an external surface at the end portion of each tooth forms an uninterrupted arc of a circle having the same center as a rotor part of said rotary machine.

4. An armature for an electric rotary machine according to claim 1, wherein said anchor means includes two anchors extending inside the opening of each slot from both sides of that slot, respectively.

5. An armature for an electric rotary machine according to claim 1, wherein said anchor means include one anchor extending inside the opening of each slot from one side of that slot.

6. An armature for an electric rotary machine according to claim 1, wherein said armature is a rotor.

7. An armature for an electric rotary machine according to claim 1, wherein said armature is a stator.

8. An method for manufacturing an armature of a rotary machine comprising the steps of:
    stacking a plurality of steel plates to produce a laminated armature having teeth that have axes which extend in a radial direction and are separated by slots;
    forming through-holes extending through end portions of each of the teeth, said through-holes having longitudinal axes extending parallel to said slots, each said through-hole having a continuous interior wall within the periphery of said end portion;
    placing windings into said slots; and
    compressing the end portions of the teeth to close the through-holes and thereby displace part of the end portion of each tooth into a position overlying the windings in at least one of the slots adjacent said tooth.

9. A method according to claim 8 wherein the through-holes are elongated slots each having a major axis lying in a generally circumferential direction with slot edges on opposite sides of said axis, and the compressing step forces said slot edges into an abutting relationship.

10. A method according to claim 8, wherein said compressing is achieved by applying a force in a radial direction relative to the armature.

11. A method according to claim 8, wherein said compressing is achieved by applying a force in a direction oblique to a radial direction of the armature.

12. A method according to claim 8, further comprising the step of forming each slot with its edges curved prior to the step of placing windings into the slots.

* * * * *